INVENTOR
STEFAN FISCHER

INVENTOR
STEFAN FISCHER
BY

United States Patent Office 3,332,109
Patented July 25, 1967

3,332,109
APPARATUS FOR WITHDRAWING AND TRANS-FERRING MOLDED OBJECTS FROM A BLOWING MOLD
Stefan Fischer, Lohmar, Bezirk Cologne, Germany
Original application July 24, 1963, Ser. No. 297,438. Divided and this application Apr. 6, 1966, Ser. No. 540,748
Claims priority, application Germany, July 25, 1962, F 37,415; Nov. 26, 1962, F 38,393
5 Claims. (Cl. 18—5)

This is a division of my co-pending application, Ser. No. 297,438, filed July 24, 1963 and now Patent No. 3,295,159, claiming priority under the German applications: F 37,415 X/39$a^2$ filed July 25, 1962; F 38,393 X/39$a^2$ filed Nov. 26, 1962; and F 38,911 X/39$^2$ filed Feb. 2, 1963.

This invention relates generally to the molding of thermoplastic materials, and is especially concerned with improvements in blow-molding apparatus, as for the production of bottles or similar hollow objects.

As is well known to those versed in the art, the rate of blow-molding production is usually limited by the cycle time, in that the cycle time must include the relatively long cooling or setting period of the molded thermoplastic material. That is, by conventional molding procedures, the product of a mold must be cooled or set before its removal and the introduction of material for the next product to be molded.

Accordingly, it is an important object of the present invention to provide a highly improved apparatus for blow-molding, or the like, wherein a molded object may be quickly, easily and automatically removed from the mold before cooling of the object is completed, thereby enabling the next quantity of moldable material to be inserted in the mold in relatively rapid succession, resulting in an extremely high rate of production per machine.

It is another object of the instant invention to provide apparatus of novel and improved construction for practice of the present method.

It is still a further object of the present invention to provide an apparatus for blow-molding having the advantageous characteristics mentioned in the preceding paragraphs, which are extremely simple, effect substantial economies in costs, and are entirely reliable in operation.

Other objects of the present invention will become apparent upon reading the following specification and referring to the accompanying drawings, which form a material part of this disclosure.

The invention accordingly consists in the combinations and arrangements of apparatus, which will be exemplified in the following description, and of which the scope will be indicated by the appended claims.

Figure 1:
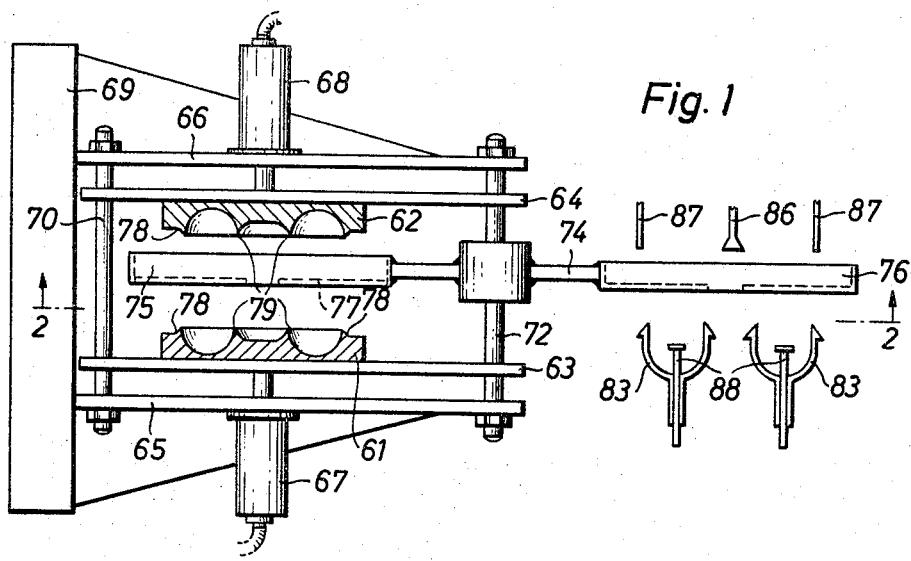
FIGURE 1 is a plan view, partly in section, illustrating molding apparatus for use in practice of the instant method.

As is well known, blow-molding procedures require, in addition to the separable mold, an extruder for extruding a tube, parison or preform, which may be conventional in the instant invention, and is, therefore, not shown in the drawings.

Figure 2:
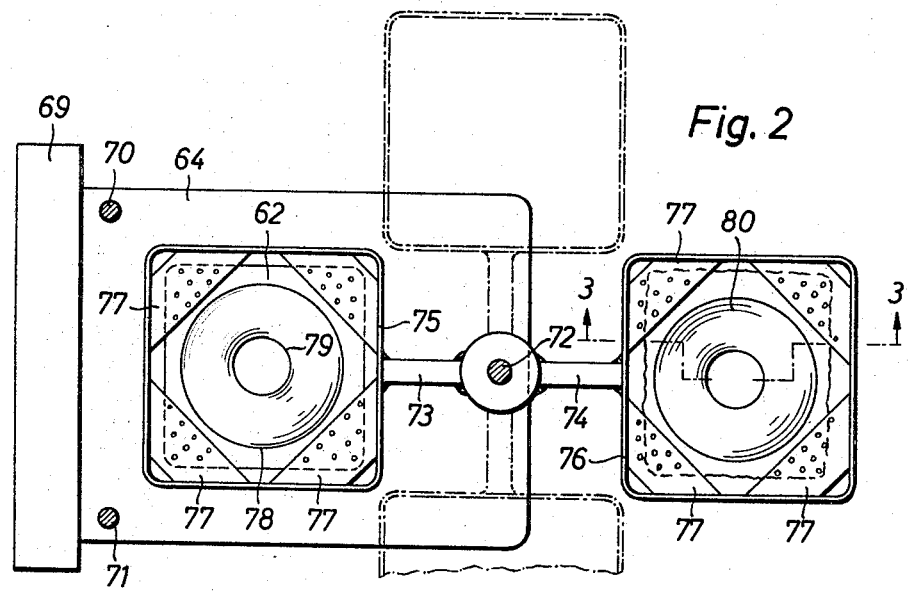
FIGURE 2 is a sectional elevational view taken generally along the line 2—2 of FIGURE 1, and illustrating alternative positions in dot-and-dash outline.
Figure 3:
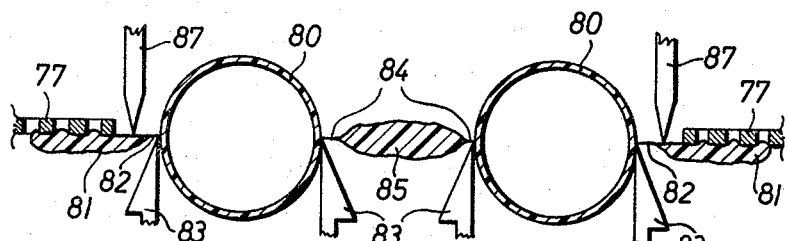
FIGURE 3 is a fragmentary sectional view taken generally along the line 3—3 of FIGURE 2, enlarged for clarity.

Referring now more particularly to the drawings, and specifically to FIGURES 1–3 thereof, a pair of complementary mold sections or halves 61 and 62 are shown, each having a complementary internal cavity combining to define a toroidal configuration, for purposes of illustration only. The mold halves 61 and 62 are respectively attached to mold-retaining plates or carriers 63 and 64. Respectively adjacent to the retaining plates 63 and 64 are a pair of support members or plates 65 and 66, each carrying a respective actuating means or cylinder 67 and 68. A mounting structure or frame 69 is provided to mount the support plates 65 and 66, and through the support plates to support the remainder of the structure.

Rigidly interconnecting the support plates 65 and 66 may be a plurality of generally parallel guide members or rods, being illustrated as three in number 70, 71 and 72. The guide rods 70, 71 and 72 may serve the further function of supporting the mold-retaining plates 63 and 64 for movement along the guide rods, say by suitable bearings (not shown).

Additionally, as seen in FIGURE 2, the guide rod 72 serves to carry a rotatable hub, from which may project a plurality of radial arms, as at 73 and 74. Any desired number of radial arms may be provided, in addition to the arms 73 and 74, say as illustrated in phantom in FIGURE 2.

At the outer end of each arm 73 and 74 there is a frame or carrier, 75 and 76, respectively. The frames or carriers 75 and 76 may each be provided with reticulate sheets or apertured plates, as at 77. The frames 75 and 76 are illustrated as being generally rectangular and the apertured plates 77 as four in number, extending diagonally across respective corners of the frames, but other suitable configurations may be employed, if desired.

The guide rod 72 and arms 73 and 74, carried on the guide rod, are positioned and arranged so that each of the frames 75 and 76 may, in turn, be located centrally between the pair of mold halves 61 and 62. When either of the frames 75 and 76 are in position between the mold halves 61 and 62, the apertured plates 77 of the intermediate frame will be located between the mold halves but exteriorly about the cutoff edges 78 of the mold parts. Thus, the mold is free to close, as by movement of the mold halves 61 and 62 into their mating relation, with the apertured plates 77 remaining between the mold halves exteriorly of the cutoff edges 78.

Obviously, the arms 73 and 74, and their respective frames 75 and 76 may be rotated about the axis of rod 72 only when the mold halves 61 and 62 are separated from each other.

Exteriorly or outward of the cutoff edge 78 of each mold half, the facing mold surface is recessed, as at 78$a$, so that a groove is defined about the mating cutoff edges 78 when the mold halves are moved together. The apertured plates 77 are located in the circumferential groove about the mating cutoff edges 78. When the apertured plates 77 are in position between the closed mold halves 61 and 62, the plates are located to receive and absorb in the apertures thereof the excess of thermo-plastic material squeezed exteriorly of the cutoff edges 78 upon closure of the mold halves and expansion of the moldable material in the mold cavities.

In operation, after the apertured plates 77 of one frame 75 are moved to their operative position between the mold halves 61 and 62, and the extruded tube or preform is in position between the mold halves, the mold halves will close. The excess or surplus material of the preform will be squeezed together by the cutoff edges 78 of the mold halves. This excess or surplus material will move together and partially into the apertured plates 77, thereby becoming fastened and adherent to the apertured plates. The tube is then blown in the conventional manner into the shape of the internal cavity of the now closed mold.

In conventional blow-molding procedures, it would be necessary to wait for substantially complete cooling of the blown material before removal from the mold. However, by the teachings of the instant invention, the blown form may be removed before complete cooling thereof, by opening of the mold and swinging of the frame 75 out of its position between the mold halves. As the excess molding material is adherent to the plates 77, the blown form is carried by the frame 75 without being touched, or otherwise damaged.

After the blown object has entirely cooled, in its position away from the mold halves, the excess or surplus material may be removed from the blown object, as in the manner described in my copending parent application Ser. No. 297,438, now Patent Number 3,295,159.

As best seen in FIGURE 2, the above procedure may be accomplished by separating the mold halves 61 and 62 after the blown object therein has only been partially cooled. The blown object will still be held in position, although no longer contacted by the mold halves themselves, by the apertured plates 77 adhered to the excess or surplus material. The arm 73 is rotated, say 180 degrees to the position occupied by arm 74 in FIGURE 2; and, if additional frames 75 are provided the angular rotation will, of course, be less.

Thus, one blown hollow object, together with the excess or surplus material appended thereto, will be allowed to cool outside of the mold, while an additional heated preform is interposed between the mold halves and the latter are closed to effect the blowing operation. Thus, a plurality of cycles may be carried out in simultaneous or overlapping timed relation in accordance with the teachings of the instant invention.

At the completion of cooling, the finished blown object 80 may be automatically removed from the plates 77, as is best seen by reference to FIGURE 3 and the right-hand part of FIGURE 1. A pair of double-knife structures are provided in operative position with respect to each of the frames 75 and 76 when away from the mold halves 61 and 62. These double-knife structures 83 will be adjustably positioned and automatically actuated so as to move around the edges of the finished blown object 80, as seen in FIGURE 3. When the double-knife structure 83 is so actuated, it will sever the bridges 82 and 84 of thermoplastic material connecting the finished blown object 80 with the body of excess or surplus material 85. Pusher bars 88 may then be automatically actuated to eject the finished hardened hollow blown object 80. The pusher bar 86, in turn, may be utilized to eject the surplus or excess material 85 in the opposite direction. Pusher bars 87 additionally serve to detach the excess material 81 from the apertured plates 77.

It will now be evident that the finished blown hollow object 80, after cooling and with all surplus and excess material removed, will fall to one side and may be collected for use. The flash or excess or surplus material will, in turn, fall to the other side and may be collected to be reground and reused, as desired.

The operating cycle of this improved device will be considerably faster and more efficient than in any of the prior-art units, as the blown object does not of necessity have to be cooled within the mold, and when delivered from the machine will have all excess or surplus material removed therefrom.

Figure 4:
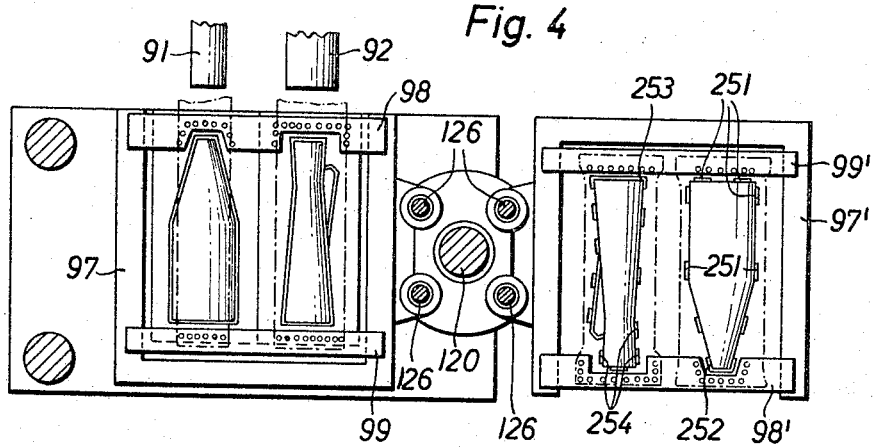
FIGURE 4 is a sectional view taken generally along the line 4—4 of FIGURE 5, corresponding to the view of FIGURE 2, but illustrating another apparatus adapted to be employed in practice of the instant invention.
Figure 5:
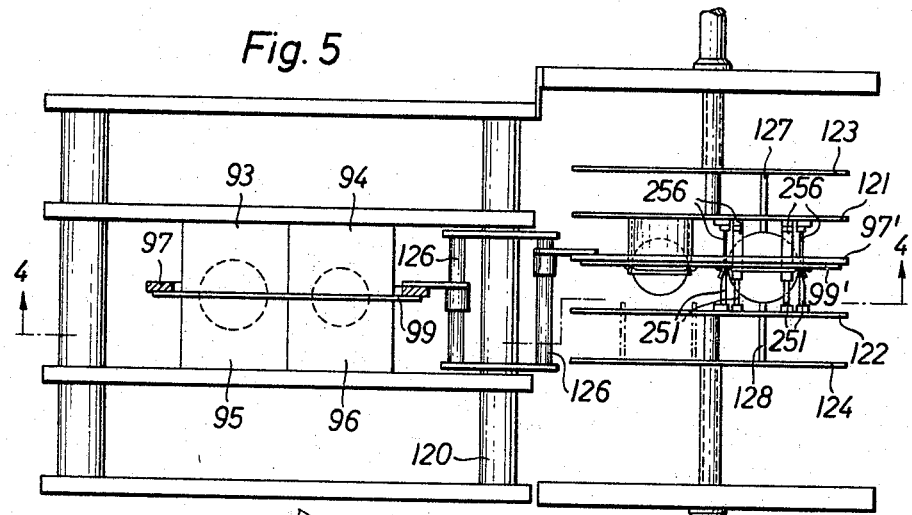
FIGURE 5 is a plan view of the apparatus of FIGURE 4.
Figure 6:
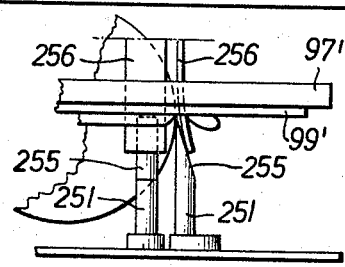
FIGURE 6 is an enlarged fragmentary view of the apparatus of FIGURE 5.

In the slightly modified embodiment of FIGURES 4, and 5, and 6, there is illustrated apparatus for use in practice of the instant invention, wherein a plurality of differently shaped objects may be formed simultaneously. By way of example there is illustrated a vase and a decanter being formed simultaneously.

In FIGURE 4 there is shown a fragment of extruded tubes or parisons 91 and 92 just prior to insertion between the halves or sections of molds 93, 95 and 94, 96, when the mold halves are open. The mold halves 93 and 95, and 94 and 96 close upon the extruded tubes 91 and 92, and the excess or surplus material is squeezed by the cutoff edges into surrounding grooves, as in the first-described embodiment. Also, apertured plates 98 and 99 are provided in the grooves surrounding the cutoff edges of the mold halves to receive the excess or surplus material, and to grip the material by portions of the material passing into the plate apertures. After the articles have been blown and partially cooled, the mold halves 93 and 95, and 94 and 96 are opened or separated. The blown objects are then held in place by adherence of the still connected excess or surplus material to the apertured plates 98 and 99.

The apertured plates 98 and 99 are supported by a frame 97 which may be journaled for rotation about a rod 120. Thus, the apertured plates 98 and 99, together with the excess material and the blown objects, will be rotated about bar or rod 120 to the position shown on the right in FIGURE 4. In this position the hollow objects are supported by the surplus or excess material, and the hollow objects may finish their cooling cycle out of and away from the molds 93 and 95, and 94 and 96. This position will be referred to hereinafter as the alternate or cooling station.

The alternate station of the apparatus is provided with two pairs of plates 121 and 122, and 123 and 124. The plates 123 and 124, which are fixed in position, will be referred to therein as the outer plates, and the movable plates 121 and 122 will be referred to as the inner plates. The inner pair of plates 121 and 122 will serve primarily to support the knife and shear elements, as will appear more fully hereinafter. Each of the inner plates 121 and 122 will be mounted for movement toward and away from its corresponding outer plate 123 and 124. The movement of the inner plates 121 and 122 may be automatically controlled by any suitable means, such as hydraulic cylinders and piston rods, as indicated. Thus, for example, plate 121 may be automatically moved, as desired, toward or away from the plate 123. The inner plate 122 may be independently moved toward and away from the outer plate 124.

The frame 97' which will be positioned for free lateral movement on rod 126, will be located by automatic means between inner and outer plates 121 and 122. This position may not be in alignment with that shown at the left of FIGURES 4 and 5, to permit free movement of the frames 97 and 97' in noninterfering relationship with the mold halves 93, 94, 95, and 96.

It will be necessary, in the alternate or cooling position, to remove the surplus material from the formed hollow objects. This may preferably be accomplished by the knife elements and their corresponding parts. As shown in the drawings, several individual knife elements 251, 252, 253 and 254 are provided on one of the inner plates 122 in such a manner as to surround each of the formed hollow objects. When the plate 122 moves away from the outer plate 124, the knife elements 251, 252, 253 and 254 will approach the frame 97' and the blown hollow objects thereon, together with the surplus or excess material. Simultaneously, the other inner plate 121, with the corresponding slide elements 256 mounted thereon will approach the frame 97' retaining the finished hollow articles by their excess or surplus material. Each of the knife elements 251, 252, 253 and 254 will have at least one slide element 256 in alignment therewith.

Thus, when the plates 121 and 122 approach each other and are extended a maximum distance from their corresponding outer plates 123 and 124, they will cut off the excess or surplus material, as best seen in FIGURE 6.

The slide elements 256 may each be fabricated of somewhat flexible material for ease of bending. As each of the knife elements, for example 251 in FIGURE 6, approaches its corresponding slide element 256, it will shear off the excess or surplus material along the periphery of the finished hollow object. As this excess or surplus material retains the blown object within the frame 97′, the cutting off of the surplus material will permit the finished hollow object to fall free of the assembly and be collected, as in a bin, for later use. After the ejection of the finished product, the inner plates 121 and 122 may be separated and the frame 97′ may be rotated about the rod or shaft 120 to be returned to the mold halves 93, 94, 95 and 96 for operation of the next cycle. Prior to the movement of frame 97′ to the area of the mold halves 93–96, the frame 97′ will be laterally to one side, as on the bar or rod 126, to permit free movement of the extruded tubes 91 and 92 into the space between the open mold halves. When the extruded tubes are in position, the frame 97 and 97′ will be moved to the area between the molds, and the next cycle commenced, as set forth hereinbefore. The knife elements 251, 252, 253, and 254 are assembled on the inner plate 122 and the slide elements 256 are assembled on the inner plate 121, in an easily adjustable and removable manner, as by screws or the like. This permits these elements to be easily changed and adjusted to correspond to any shape of hollow object being formed. The knife elements may be relatively short, as for example 251, or may be relatively long to cover an area of the finished hollow objects, as for example knife elements 252 and 253.

The gliding motion of the slide elements 256 over the knife elements 251, 252, 253 and 254 will insure the entire and uniform removal of the bridge of surplus material connected to the hollow object. Ejection bars, for example at 127 and 128, may be provided passing through suitable openings in the inner plates 121 and 122 to insure the removal and automatic ejection of the finished hollow objects after the surplus or excess material is removed. The ejection bars 127 and 128 may be in a similar manner secured, as by screws or the like.

It will now be appreciated that the instant invention provides advantageous results never before obtainable in the blow-molding art. Not only will hollow objects be produced without surplus or excess material attached thereto, which must be subsequently removed by manual operation, but the molding cycle itself may be accelerated by removal of blown objects from the mold prior to complete cooling thereof, for earlier commencement of the next molding cycle.

It will now be understood that the instant invention provides apparatus which fully accomplishes its intended objects and is well adapted to meet practical conditions of use.

Although the present invention has been described in some detail by way of illustration and example for purposes of clarity of understanding, it is understood that certain changes and modifications may be made within the spirit of the invention and scope of the appended claims.

What is claimed is:

1. Blow-molding apparatus comprising a pair of mold sections mounted for movement toward and away from each other and having complementary cavities on their facing sides, at least one of said mold sections being formed on its facing side with a recess spaced outwardly from the associated cavity, a carrier mounted for movement toward and away from said mold sections, and perforate sheet means on said carrier for movement therewith and located in said recess when said carrier is in its position of movement toward said mold sections and the mold sections are moved toward each other, said sheet means being movable with said carrier away from said mold sections when the latter are moved away from each other, whereby a parison blow-molded in said cavities has its excess material attached to said sheet means by engagement therethrough for movement of the molded article from the mold sections with said carrier upon carrier movement away from said mold sections.

2. Blow-molding apparatus according to claim 1, said recess extending substantially about the associated cavity, said carrier comprising a frame having an opening, and said sheet means extending into said opening substantially thereabout for location in said recess.

3. Blow-molding apparatus according to claim 1, in combination with cutter means at a location spaced from said mold sections, said carrier being movable away from said mold sections toward said cutter means, for positioning a molded article to be severed by said cutter means from said excess material.

4. Blow-molding apparatus according to claim 3, in combination with pivot means mounting said carrier for swinging movement between said mold sections and cutter means.

5. Blow-molding apparatus according to claim 1, said recess extending substantially about the associated cavity, the other mold section being formed on its facing side with a recess spaced outwardly from and extending substantially about the cavity of said other mold section, said recesses combining to define a groove when said mold sections are moved toward each other, said carrier comprising a frame having an opening, and said sheet means extending into the opening of said frame substantially thereabout for location in said groove.

References Cited

UNITED STATES PATENTS 3,040,376   6/1962   Elphee _____ 18—5
3,266,083   8/1966   Kemp _____ 18—5 XR J. SPENCER OVERHOLSER, *Primary Examiner.*

W. L. McBAY, *Assistant Examiner.*